US010212719B2

United States Patent
Ishii

(10) Patent No.: US 10,212,719 B2
(45) Date of Patent: Feb. 19, 2019

(54) COMMUNICATION TIMING CONTROL METHOD, COMMUNICATION SERVICE SYSTEM AND WIRELESS COMMUNICATION TERMINAL

(71) Applicant: Hitachi Kokusai Electric Inc., Tokyo (JP)

(72) Inventor: Takahito Ishii, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 16 days.

(21) Appl. No.: 15/546,108

(22) PCT Filed: Feb. 12, 2015

(86) PCT No.: PCT/JP2015/053782
§ 371 (c)(1),
(2) Date: Jul. 25, 2017

(87) PCT Pub. No.: WO2016/129074
PCT Pub. Date: Aug. 18, 2016

(65) Prior Publication Data
US 2018/0007699 A1 Jan. 4, 2018

(51) Int. Cl.
*H04W 72/12* (2009.01)
*H04W 4/04* (2009.01)
*H04W 16/12* (2009.01)
*H04W 52/60* (2009.01)
*H04W 72/04* (2009.01)
(Continued)

(52) U.S. Cl.
CPC ............ *H04W 72/12* (2013.01); *H04W 4/04* (2013.01); *H04W 16/12* (2013.01); *H04W 52/60* (2013.01); *H04W 72/048* (2013.01); *H04W 72/0413* (2013.01); *H04W 72/121* (2013.01);
(Continued)

(58) Field of Classification Search
CPC ........ H04W 72/12; H04W 4/04; H04W 16/12
See application file for complete search history.

(56) References Cited

U.S. PATENT DOCUMENTS

2012/0076085 A1* 3/2012 Chou .................... H04W 68/00
370/329

FOREIGN PATENT DOCUMENTS

| JP | 2010-118744 A | 5/2010 |
| JP | 2014-155161 A | 8/2014 |
| JP | 2014-212425 A | 11/2014 |

OTHER PUBLICATIONS

International Search Report of PCT/JP2015/053782 dated May 19, 2015.

* cited by examiner

*Primary Examiner* — Siming Liu
(74) *Attorney, Agent, or Firm* — Mattingly & Malur, PC

(57) ABSTRACT

A communication timing control method for a communication service system provided with wireless communication devices, a wireless network, and an upper server groups the wireless communication devices using device information including characteristics of a service provided to the wireless communication devices entering the communication service system via the wireless network, characteristics of communication data handled in an execution application for receiving the provided service, and transfer characteristics of the wireless communication devices receiving the provided service. Next, a group-specific communication timing is determined for the grouped wireless communication
(Continued)

devices. Next, communication is performed on the basis of the determined communication timing.

18 Claims, 12 Drawing Sheets

(51) Int. Cl.
*H04W 4/70* (2018.01)
*H04W 4/021* (2018.01)
*H04L 29/08* (2006.01)
*H04W 4/08* (2009.01)

(52) U.S. Cl.
CPC ........... *H04L 67/325* (2013.01); *H04W 4/021* (2013.01); *H04W 4/08* (2013.01); *H04W 4/70* (2018.02)

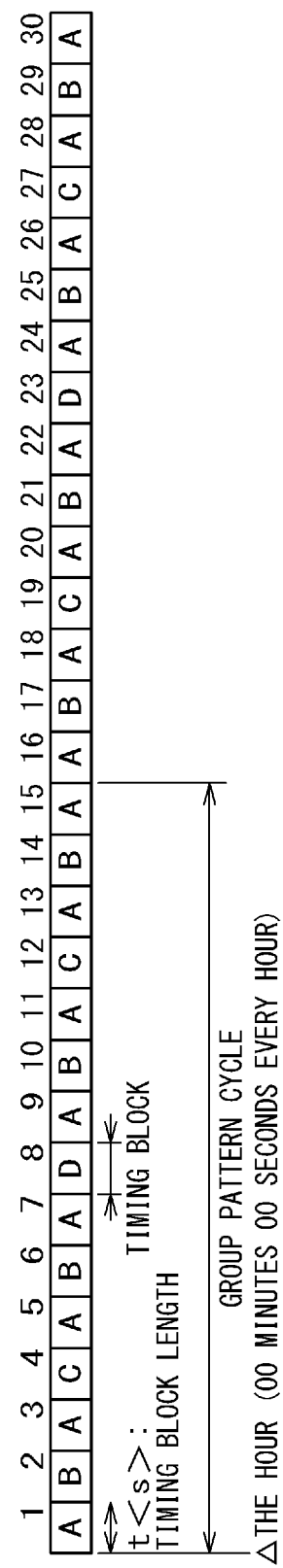

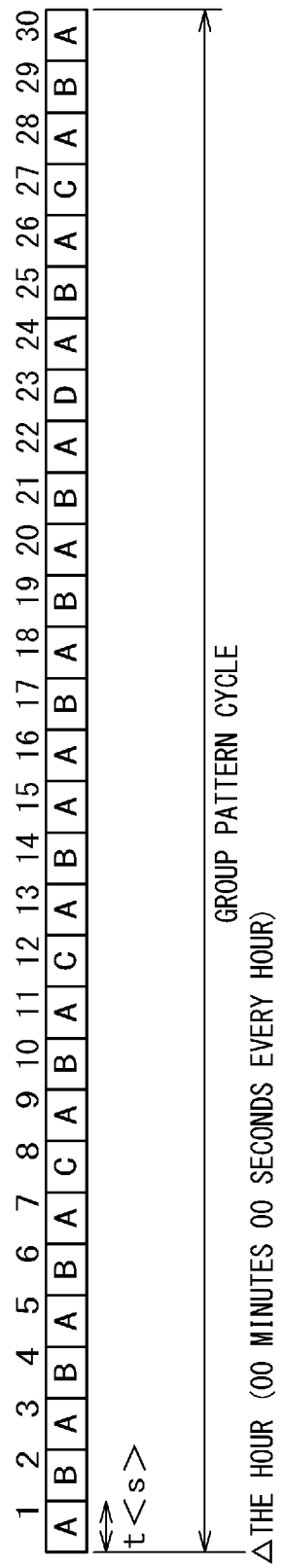

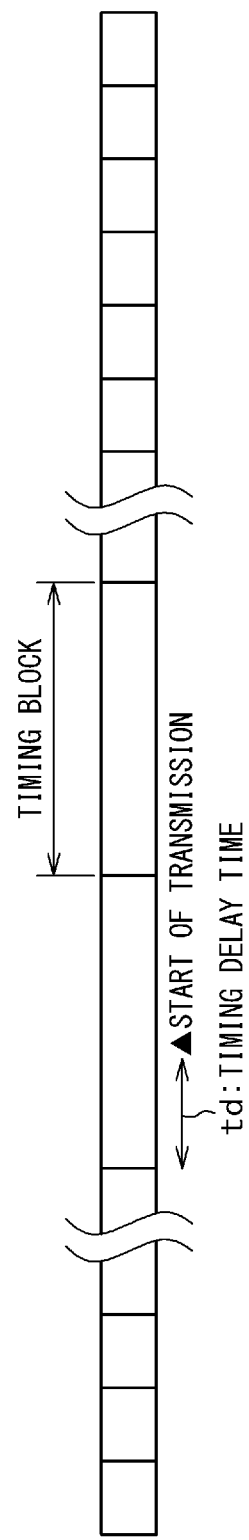

FIG.7

DEVICE INFORMATION

| ITEM | CONTENT | |
|---|---|---|
| DEVICE INFORMATION | DEVICE TYPE<br>DEVICE ID<br>DEVICE VER<br>DEVICE STATE<br>⋮ | |
| CONNECTION INFORMATION | CONNECTION MODE<br>IP ADDRESS<br>⋮ | |
| MOBILITY TYPE | FIXED INSTALLATION/LOW-SPEED MOVING/HIGH-SPEED MOVING | |
| SERVICE TYPE | CHARACTERISTICS OF PROVIDED SERVICE | |
| APPLICATION DATA INFORMATION | DATA #1 | PERIODICITY<br>IMMEDIACY<br>DATA VOLUME<br>⋮ |
| | ⋮ | |
| | DATA #k | PERIODICITY<br>IMMEDIACY<br>DATA VOLUME<br>⋮ |
| | ⋮ | |
| | DATA #n | PERIODICITY<br>IMMEDIACY<br>DATA VOLUME<br>⋮ |

FIG. 8

| | | | SCORING CRITERIA (EXAMPLE) | INDIVIDUAL SCORE (EXAMPLE) | TOTAL SCORE | GROUP ASSIGNMENT (EXAMPLE) |
|---|---|---|---|---|---|---|
| MOBILITY TYPE | | FIXED INSTALLATION/LOW-SPEED MOVING /HIGH-SPEED MOVING | FIXED: "HIGH", LOW-SPEED: "MEDIUM", HIGH-SPEED: "LOW" | 5 | — | — |
| SERVICE TYPE | | CHARACTERISTICS OF PROVIDED SERVICE | SOCIAL INFRASTRUCTURE: "LOW" INDIVIDUAL USER SYSTEM (SMALL-SCALE): "HIGH" INDIVIDUAL USER SYSTEM (LARGE-SCALE): "MEDIUM" | 5 | — | — |
| APPLICATION DATA INFORMATION | DATA #1 (default) | PERIODICITY (SHORTEST DATA GENERATION INTERVAL) | LONG -> SHORT: SCORE "HIGH" -> "LOW" | 5 | 25 | D |
| | | IMMEDIACY | LESS IMMEDIATE INFLUENCING: "HIGH", MORE IMMEDIATE INFLUENCING: "LOW" | 5 | | |
| | | DATA VOLUME | LARGE -> SMALL: SCORE "HIGH" -> "LOW" | 5 | | |
| | ... | ... | | — | — | — |
| | DATA #k | PERIODICITY | | 2 | 19 | C |
| | | IMMEDIACY | | 5 | | |
| | | DATA VOLUME | | 2 | | |
| | ... | ... | | — | — | — |
| | DATA #n | PERIODICITY | | 1 | 13 | B |
| | | IMMEDIACY | | 1 | | |
| | | DATA VOLUME | | 1 | | |
| | ... | ... | | — | | |

HIGHEST SCORE: 5  
LOWEST SCORE: 1

SETTING CONTROL INFORMATION (EXAMPLE)

| ITEM | CONTENT | |
|---|---|---|
| DEVICE SETTING INFORMATION | SETTING CONTROL COMMAND ⋮ | |
| TIMING BLOCK ALLOCATION INFORMATION | GROUP PATTERN CYCLE<br>TIMING BLOCK LENGTH<br>GROUP PATTERN<br>TIMING BLOCK ALLOCATION UPDATE TIMING (TIME)<br>⋮ | |
| GROUP ALLOCATION INFORMATION | DATA #1 | |
| | ⋮ | |
| | DATA #k | |
| | ⋮ | |
| | DATA #n | |

FIG. 9B

SETTING CONTROL ACKNOWLEDGMENT (EXAMPLE)

| ITEM | CONTENT |
|---|---|
| DEVICE SETTING INFORMATION | SETTING CONTROL COMMAND ACK ⋮ |
| TIMING BLOCK ALLOCATION INFORMATION | TIMING BLOCK ALLOCATION INFORMATION ACK |
| GROUP ALLOCATION INFORMATION | GROUP ALLOCATION INFORMATION ACK |

COMMUNICATION TIMING CONTROL METHOD, COMMUNICATION SERVICE SYSTEM AND WIRELESS COMMUNICATION TERMINAL

TECHNICAL FIELD

The present disclosure relates to a communication service system and is applicable to, for example, a control method for the communication timing of a wireless communication terminal of a wireless communication device in a communication service system.

BACKGROUND ART

For example, wireless communication systems are used as communication service systems including a plurality of wireless communication terminals and configured to monitor equipment in factories and plants and collect inventory information from vending machines or the like and data from meters for use quantities of electricity, gas, and tap water by wireless communication. Wireless communication systems may be connected with a server or the like via a wired network to manage date collected through wireless communication terminals.

As a wireless communication terminal used in wireless communication systems, a system utilizing a private system based on a specific low power wireless device or the like or a system utilizing the same public network system as cellular phones are based on a wireless data module or the like is adopted. There can be cases where several thousands to several tens of thousands of wireless communication terminals are present in a single network.

CITATION LIST

Patent Literature

PTL 1: Japanese Unexamined Patent Application Publication No. 2014-212425

SUMMARY OF INVENTION

Technical Problem

With respect to wireless communication devices having a wireless communication terminal in a wireless communication system (communication service system), an event is expected after the operation of the wireless communication devices is stopped by an external power source being interrupted due to a power failure or the like. When the external power source is recovered and a plurality of the wireless communication devices on the system are supplied with power in unison, it is expected that the wireless communication devices under the charge of the communication service system will start communication in unison. In such a case, the system processing by the communication service system is congested and this may lead to such a trouble as system down.

It is an object of the present disclosure to provide a technology to reduce an communication load on an entire communication service system due to temporal concentration when it is expected that the wireless communication devices under the charge of the communication service system will start communication in unison.

Solution to Problem

Representative configuration elements of the present disclosure will be briefly described as follows:

In a communication timing control method for a communication service system including wireless communication devices, a wireless network, and a higher-level server, the wireless communication devices are grouped using device information including: the characteristics of services provided to the wireless communication devices participating in the communication service system via the wireless network; the characteristics of communication data handled in an execution application for receiving the provided services; and the mobility characteristics of the wireless communication devices receiving the provided services. Communication timing specific to each group is determined for the grouped wireless communication devices. Communication is performed based on the determined communication timing.

Advantageous Effects of Invention

According to the above communication timing control method, a communication load on an entire communication service system due to temporal concentration can be reduced when it is expected that the wireless communication devices under the charge of the communication service system will start communication in unison.

BRIEF DESCRIPTION OF DRAWINGS

FIG. 4 is a drawing illustrating a concept of group allocation in a communication service system in the example;

FIG. 5 is a drawing illustrating a concept of group allocation in a communication service system in the example;

FIG. 6 is a drawing illustrating a concept of timing dispersion with respect to timing blocks in a communication service system in the example;

FIG. 7 is a drawing illustrating an example of device information in a communication service system in the example;

FIG. 8 is a drawing illustrating a concept of grouping in a communication service system in the example;

FIG. 9A is a drawing illustrating an example of setting control information in a communication service system in the example;

FIG. 9B is a drawing illustrating an example of setting control acknowledgment in a communication service system in the example;

DESCRIPTION OF EMBODIMENTS

Figure 1:
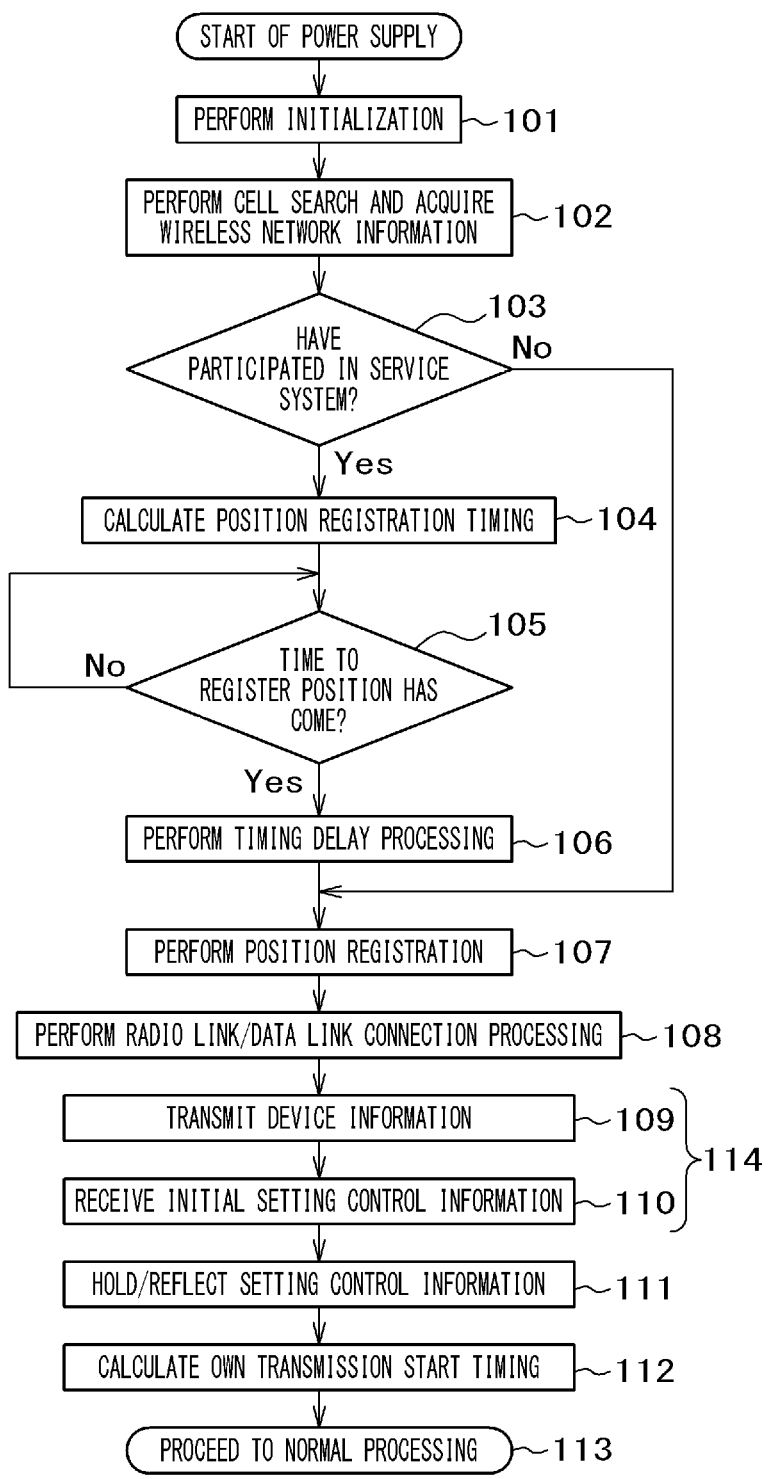
FIG. 1 is a flow diagram illustrating the operation of a wireless communication device in an example as is started up.

Hereafter, a description will be given to an example of the present invention with reference to the drawings. In the following description, identical configuration elements will be marked with identical reference numerals and a repetitive description thereof may be omitted.

Figure 10:
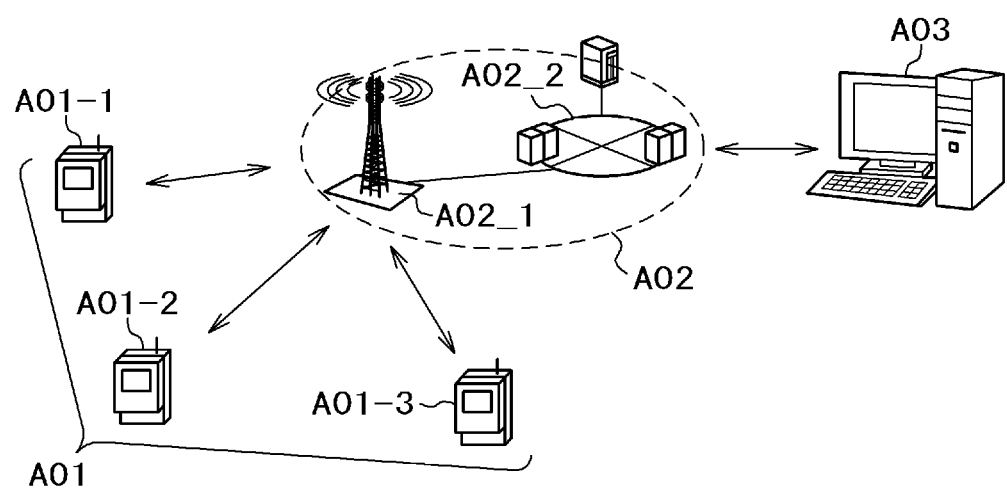
FIG. 10 is a drawing illustrating a communication service system.

First, a communication service system will be described with reference to FIG. 10. FIG. 10 illustrates a configuration of the communication service system.

The communication service system 10 is composed of a plurality of wireless communication devices AO1 (AO1-1, AO1-2, AO1-3), a wireless network AO2, a data server (higher-level server) AO3, and the like. The wireless communication devices AO1 are a wattmeter, a vending machine, and the like having wireless communication functions. The wireless network AO2 is composed of a radio base station AO2_1, a switchboard AO2_2, and the like to which the wireless communication devices AO1 connect via a radio link. Opposed to the wireless communication devices, the higher-level server AO3 controls the services provided by the communication service system 10 by managing varied information from the wireless communication devices AO1 and delivering varied information and providing services to the wireless communication devices AO1. The wireless communication devices AO1 connect with the wireless network AO2 by a radio link and are connected to the higher-level server AO3 through the wireless network AO2. The wireless communication devices AO1 report, for example, meterage on wattmeters and inventory information of vending machines to the higher-level server AO3. As a result, users of the communication service system 10 can calculate electric charges and ship products for sale through vending machines.

Figure 11A:
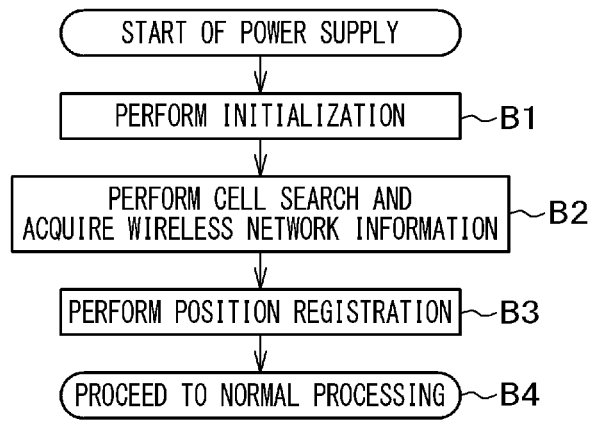
FIG. 11A is a flow diagram illustrating an example of the operation of a wireless communication device used in a communication service system.
Figure 11B:
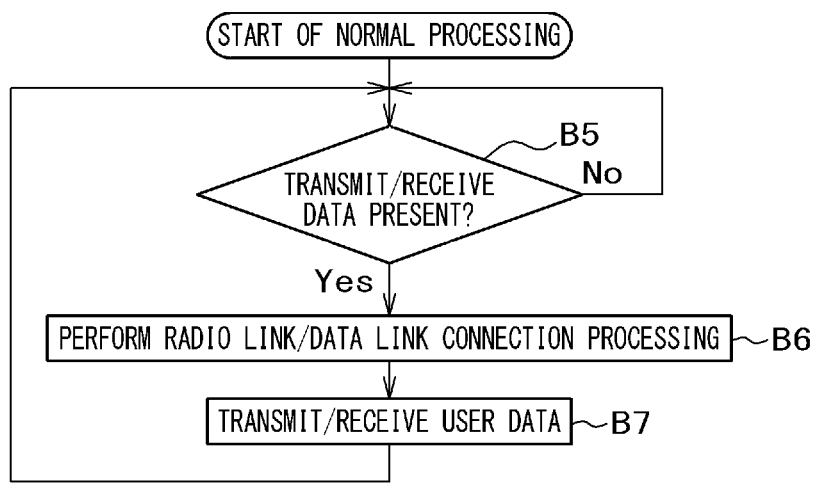
FIG. 11B is a flow diagram illustrating an example of the operation of a wireless communication device in a communication service system.
Figure 12:
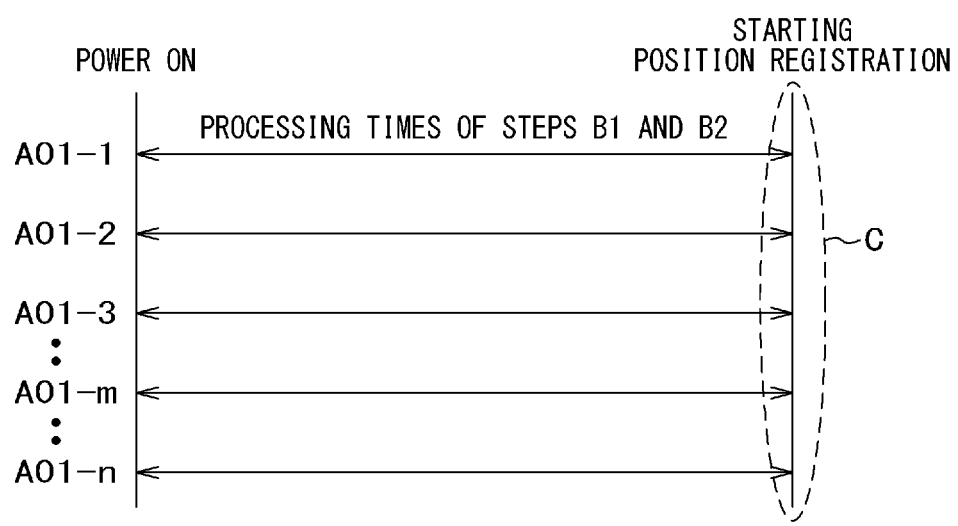
FIG. 12 is a drawing illustrating an example of the operation of a wireless communication device used in a communication service system after power restoration.

A description will be given to an example of the operation of a wireless communication device AO1 with reference to FIG. 11A, FIG. 11B, and FIG. 12. FIG. 11A and FIG. 11B are flow diagrams illustrating an example of the operation of the wireless communication device. FIG. 12 illustrates an example of the operation of the wireless communication devices after power restoration.

After power is supplied, each wireless communication device AO1 performs required device initialization processing (Step B1), searches for any nearby radio base station AO2_1 for connection with the wireless network AO2, and acquires wireless network information such as broadcast information (Step B2). In case of mobile communication system, mobile terminals must be managed. Therefore, the wireless communication device AO1 performs position registration for terminal management in the wireless network AO2 (Step B3). After the completion of position registration, the flow proceeds to normal processing (normal mode) (Step B4). In the normal mode, the wireless communication device AO1 detects whether data to transmit from the device to the higher-level server AO3 or data to be received from the higher-level server AO3 is present or not (Step B5). When it is detected that there is any transmit/receive data, the wireless communication device performs radio link/data link connection (Step B6) and performs data communication (user data transmission/reception) between the wireless communication device AO1 and the higher-level server AO3 (Step B7).

However, in the case of the operation of the wireless communication device shown in FIG. 11A and FIG. 11B, a problem may occur when power supply is restored (power restoration) after a power failure occurred over a wide area due to a large-scale disaster or the like. When power is supplied to all the wireless communication devices AO1 located within the area restored from the power failure in unison, the wireless communication devices AO1 perform position registration with the wireless network AO2 and the higher-level server AO3 in unison. This will be described with reference to FIG. 12. Power is supplied to the wireless communication devices AO1 (AO1-1 to AO1-*m* to AO1-*n*) located within the area as the result of power restoration in unison (POWER ON), the processing of Step B1 (PERFORM INITIALIZATION), Step B2 (PERFORM CELL SEARCH AND ACQUIRE WIRELESS NETWORK INFORMATION), and Step B3 (PERFORM POSITION REGISTRATION) shown in FIG. 11 is performed in all the wireless communication devices at almost the same time. In other words, all the wireless communication devices AO1 located within the area restored from the power failure start position registration with the same timing in unison as shown in the broken line C in FIG. 12. In such a case, the processing capacities of the wireless network AO2 and the higher-level server AO3 are exceeded and congestion occurs. Areas where the power failure did not occur are also influenced and system down may result.

To cope with this, in a communication service system according to the present invention, a procedure is taken when a plurality of wireless communication devices communicate with a wireless network and a server in charge of services provided by the communication service system. The wireless communication devices are grouped based on the device information of each wireless communication device and communication timing is provided for wireless communication devices assigned to the individual groups. The timing of communication from the wireless communication devices is thereby dispersed. As a result, a communication load on the entire communication service system due to temporal concentration caused by establishing communication connections in unison can be reduced.

EXAMPLE 1

A description will be given to a communication service system in an example of the present invention. The configuration of the communication service system in the example is the same as the configuration of the communication service system 10 shown in FIG. 10. Each wireless communication device AO1 includes a wireless communication terminal for data transmission with the higher-level server AO3 via the wireless network AO2 and such data terminal equipment (DTE) as a wattmeter and a vending machine.

First, a description will be given to "Service System Participation Based on Device Information," "Idea of Grouping and Timing of Transmission Permission for Wireless Communication Devices Assigned to Each Group," "Method for Grouping Wireless Communication Devices," and "Notification of Grouping Result and Acknowledgment," which are concrete means for implementing the communication service system (service system) in the example.

<Service System Participation Based on Device Information>

Figure 3:
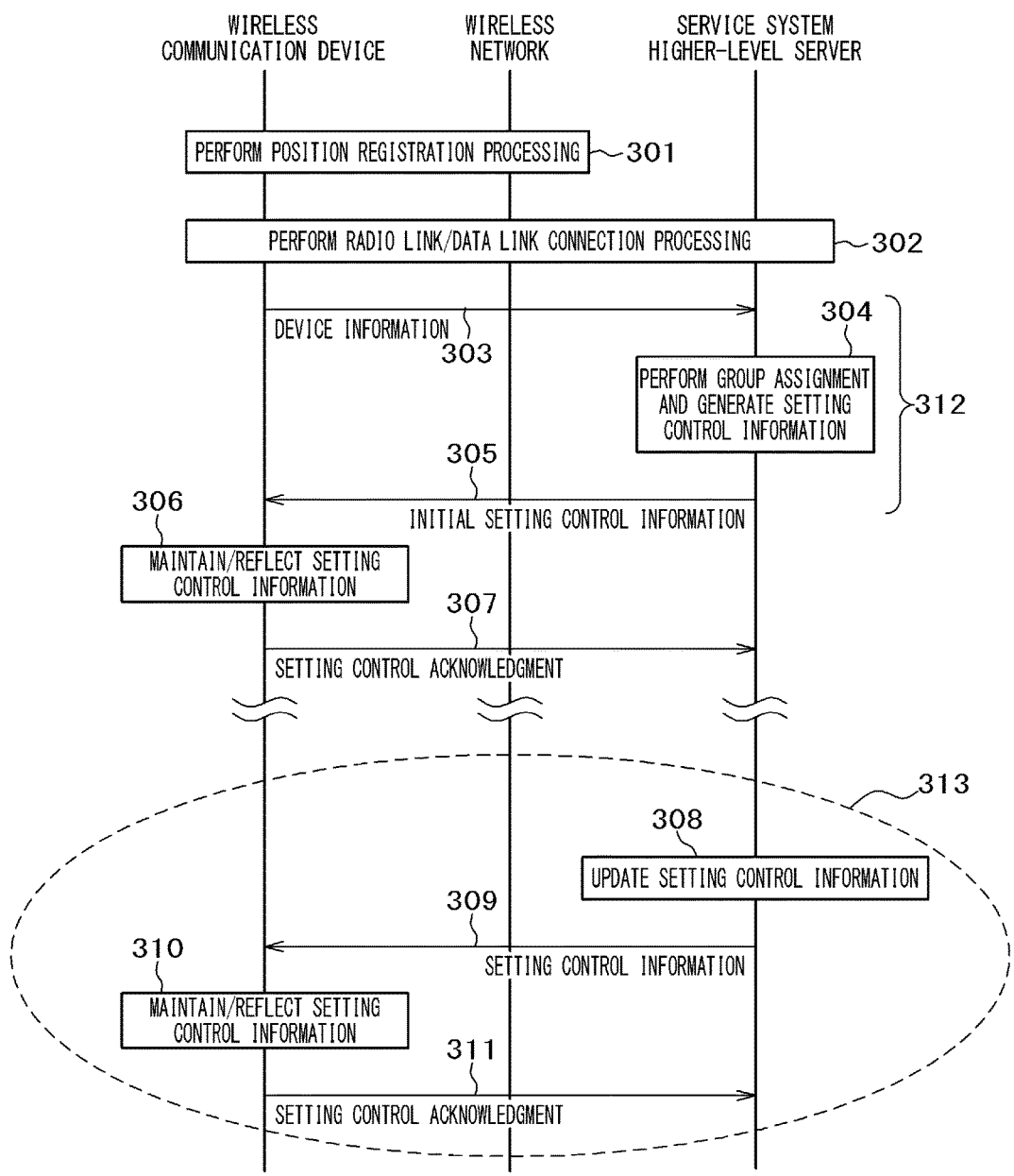
FIG. 3 is a drawing illustrating a sequence related to position registration/service system participation/setting control in a communication service system in the example.

A description will be given to service system participation based on device information with reference to FIG. 3 and FIG. 7. FIG. 3 illustrates a sequence taken between wireless communication devices and a wireless network and a higher-level server in a communication service system. FIG. 7 illustrates an example of the device information in the communication service system in the example.

To establish a communication path for providing services between the wireless communication devices AO1 and the wireless network AO2 and the higher-level server AO3, position registration processing (Step 301) and radio link/data link connection processing (Step 302) are performed. Subsequently, processing for participating in the service system (Step 312) is performed. Specifically, the following steps are taken as the service system participation processing (Step 312). Triggered by device information transmission from the wireless communication devices AO1 to the higher-level server AO3 (Step 303), group assignment and setting control information generation are performed for the wireless communication devices AO1 at the higher-level server AO3 (Step 304). The generated setting control information (initial setting control information) is transmitted to the wireless communication devices AO1 (Step 305).

A description will be given to device information transmitted from the wireless communication devices AO1 to the higher-level server AO3 with reference to FIG. 7. The device information is information composed of device information, connection information, mobility information, service type including the characteristics of provided services, application data type, and the like. The device information includes, for example, device type, device ID, device Ver, device state, and the like. The connection information includes data connection mode, the IP address of the relevant device, and the like. The mobility type is information related to the mobile environment of each wireless communication device, such as fixed installation, low-speed moving, and high-speed moving. The application data type includes the periodicity, immediacy, data volume, and the like of data handled by an execution application for receiving services. When there are a plurality of types of data handled by the relevant application, a plurality of data types may be defined according to the characteristics thereof. FIG. 7 shows a case where there are n types of data handled by an application.

<Method for Grouping Wireless Communication Devices>

A description will be given to a method for grouping wireless communication devices with reference to FIG. 8. FIG. 8 illustrates a concept of grouping in the communication service system in the example.

To group the wireless communication devices AO1 based on device information transmitted by the wireless communication devices AO1, individual scores are given according to the respective parameters (device report values) of the mobility type, service type, and application data type contained in device information. Groups are determined according to the resulting total scores. Device report values are transmitted from data terminal equipment to wireless communication terminals. In the sequence shown in FIG. 3, the operation of the wireless communication devices AO1 is equivalent to the operation of the wireless communication terminals except device report values being transmitted from data terminal equipment to wireless communication terminals.

FIG. 8 shows an example in which a higher total score is determined as group D and a lower total score is determined as group A. That is, the frequency of transmission start permission is reduced with increase in score.

First, a description will be given to mobility type and individual scores therefore. There are defined three mobility types, fixed installation, low-speed moving, and high-speed moving. In case of fixed installation, it is estimated that change in surrounding radio environments, such as the movement of a cell, is small; therefore, it is estimated that accompanying transmission of data including radio control data is less frequent. Meanwhile, in case of high-speed moving, change in surrounding radio environments, such as the movement of a cell, is large and it is estimated that accompanying transmission of data is frequent. To ensure that transmission can be started in response to generation of data as mentioned above, a wireless communication device AO1 moving at high speed should be assigned to a group involving frequent transmission start permission (score "low"). Even if a fixedly installed wireless communication device AO1 is assigned to a group involving less frequent transmission start permission (score "high"), that will not probably have a great influence. In the example shown in FIG. 8, the highest individual score is 5 points and the lowest point is 1 point; therefore, for example, a score of 5 points is given to fixed installation and a score of 1 point is given to high-speed moving.

Subsequently, a description will be given to service type and individual scores therefore. Scores are determined according to the characteristics of services provided to the wireless communication devices AO1. For example, scores are determined according to such characteristics of services as shown in FIG. 8. A more specific description will be given. When a wireless communication device AO1 is equipment related to a social infrastructure or the like and is applied to provide highly public services, it can be estimated that data handled in a communication service system thereof is relatively high in importance. Therefore, wireless communication devices AO1 applied to provide services related to social infrastructures should be assigned to a group involving frequent transmission start permission (score "low"). When a wireless communication device is equipment related to an individual user system and is applied to provide relatively less public services, it is estimated that data handled in a communication service system thereof is relatively low in importance. Thus, it can be estimated that even if a wireless communication device AO1 applied to an individual user system is assigned to a group involving less frequent transmission start permission (score "high"), that will not have a great influence. Individual user systems can be classified into large-scale systems and small-scale systems depending on the number of users handled in the relevant communication service system or the like, and a "medium" score can be given to large-scale systems and a "high" score can be given to small-scale systems.

A description will be given to application data type and individual scores therefore. Scores are determined according to the characteristics of data handled by an application for executing services provided to the wireless communication devices AO1. For example, scores are determined according to such characteristics of application data as shown in FIG. 8. That is, scores are determined using the periodicity, immediacy, data volume, and the like of data as parameters. Attention will be focused on the periodicity of data. Application data characterized in that data is generated in a short cycle should be assigned to a group involving more frequent transmission start permission (score "low"). It can be estimated that even if application data characterized in that data is generated in a long cycle is assigned to a group involving less frequent transmission start permission (score "high"), that will not have a great influence. Attention will be focused on the immediacy of data. Application data characterized in that data high in immediacy is generated should be assigned to a group involving more frequent transmission start permission (score "low"). It can be estimated that even if application data characterized in that data low in immediacy is generated is assigned to a group involving less transmission start permission (score "high"), that will not have a great influence. Attention will be focused on data volume. It can be estimated that even if application data characterized in that data relatively low in volume is generated is assigned to a group involving more frequent transmission start permission (score "low"), system resources will be less probably occupied. Conversely, application data characterized in that a large volume of data is generated can be assigned to a group involving less frequent transmission start permission (score "high"). Thus, the influence of system resource occupation on other wireless communication devices AO1 can be reduced. As mentioned above, when there are a plurality of types of data handled by the relevant application, a plurality of data types may be defined according to the characteristics thereof.

Individual scores are given as mentioned above and total sores are finally calculated for each type of handled data. In the example shown in FIG. 8, the highest individual score is 5 points and the lowest score is 1 points. Instead, for example, a score of 10 points or 20 points may be taken as the highest score with respect to some parameter to assign weights depending on the contents of each parameter and the degree of contribution thereof may be changed in calculating total scores. Group assignment is performed for each data type based on the total scores. In the example shown FIG. 8, groups are defined as follows:

Scores 5 to 10: Group A
Scores 11 to 15: Group B
Scores 16 to 20: Group C
Scores 21 to 25: Group D Therefore, data #1 is determined as group D; data #k is determined as group C; and data #n is determined as group B.

<Idea of Grouping and Timing of Transmission Permission for Wireless Communication Devices Assigned to Each Group>

A description will be given to an idea of grouping and timing of transmission permission for wireless communication devices assigned to each group with reference to FIG. 4 and FIG. 8. FIG. 4 illustrates a concept of group assignment of the communication service system in the example.

As mentioned above, in the example shown in FIG. 8, wireless communication devices are assigned to four groups A to D. The wireless communication devices AO1 are different in transmission timing depending on the assigned groups. This will be described with reference to FIG. 4.

In the communication service system in the example, the wireless communication devices AO1 are grouped and communication timing is provided for the wireless communication devices assigned to each group. Dispersed control of communication timing is thereby implemented. The transmission start permission interval for some group will be defined as "timing block." Each wireless communication device AO1 is permitted to start transmission during a duration shown by "timing block length t<s>" in a timing block allocated thereto. With respect to timing block, permitted groups are switched according to a group pattern (A ->B ->A ->C ->A ->B ->A ->D ->A ->B ->A ->C ->A ->B ->A in the example shown in FIG. 4) determined in the communication service system. The invention is configured such that a series of group patterns are cyclically repeated and this repetition cycle will be defined as "group pattern cycle." That is, the grouped wireless communication devices AO1 can determine their own transmission start timing according to "group pattern," "timing block length," and "group pattern cycle." For example, when each hour (00 minutes 00 second every hour) is arranged as the start timing of cycles, a plurality of the wireless communication devices AO1 can recognize a common "timing block."

FIG. 4 shows an example in which the group pattern is A ->B ->A- >C ->A ->B ->A ->D ->A ->B ->A ->C ->A ->B ->A and the numbers of permission blocks are as follows:

Group A: 8
Group B: 4
Group C: 2
Group D: 1

That is, this example is configured such that group A is higher in the frequency of transmission start permission and group D is lower. By appropriately grouping the wireless communication devices AO1 according to the mobility type, service type, application data type, and the like thereof, communication start timing can be dispersed and transmission can be started in response to the generation of data thereof.

<Notification of Grouping Result and Acknowledgment>

A description will be given to notification of grouping results and acknowledgments with reference to FIG. 3, FIG. 9A, and FIG. 9B. FIG. 9A shows an example of setting control information of the communication service system in the example. FIG. 9B shows an example of setting control acknowledgment in the communication service system in the example.

To notify the wireless communication devices AO1 of the groups determined as mentioned above, setting control information is transmitted from the higher-level server AO3 to the wireless communication devices AO1 (Step 305). As shown in FIG. 9A, the setting control information is composed of device setting information, timing block allocation information, group allocation information for reporting group allocation results, and the like. The device setting information includes a setting control command for setting and controlling the wireless communication devices AO1. The timing block allocation information includes group pattern cycle, timing block length, group pattern, timing block allocation update timing (time), and the like. A wireless communication device AO1 that received setting control information from the higher-level server AO3 stores the setting control information in the device and reflects the contents of the setting (Step 306). Thereafter, the wireless communication device generates an acknowledgment of the setting control including ack information associated with the set information, including device setting information, timing block allocation information, and group allocation information, as shown in FIG. 9B and transmits the acknowledgment to the higher-level server AO3 (Step 307).

In the example, the wireless communication devices AO1 transmit device information to the higher-level server AO3 and the higher-level server AO3 determines groups based on the device information. Instead, the wireless devices AO1 may receive group determination criteria from the higher-level server AO3 and determine groups based on the device information possessed by the wireless devices AO1. In this case, group allocation information need not be included in setting control information. When notifying the higher-level server AO3 of a group determination result, the wireless communication devices AO1 include the group determination result in a setting control acknowledgment to be transmitted to the higher-level server AO3.

<Change of Group Pattern/Group Allocation>

A description will be given to a change of group pattern/group allocation made in consideration of the situation of participation of all the wireless communication devices with reference to FIG. 3 and FIG. 5. FIG. 5 illustrates a change of a group pattern in the communication service system in the example.

The balance of group allocation of the entire communication service system can vary depending on the number of other wireless communication devices participating in the communication service system providing services to the wireless communication devices AO1 and change in an executed application. To cope with these cases, it may be made possible to change a group pattern or group allocation. A change of a group pattern is made by updating timing block allocation information. For example, when the devices assigned to group B is increased in number as shown in FIG. 5, some of timing blocks assigned to groups C and D in FIG. 4 are re-assigned to groups B and C. For example, timing block allocation information is updated by doubling a group pattern cycle. Update is performed by taking the procedure shown in broken line 313 in FIG. 3. That is, setting control information is updated (Step 308); the updated setting control information is transmitted to the wireless communication devices AO1 (Step 309) and is received, updated and maintained, and reflected by the wireless communication devices AO1 (Step 310); and a setting control acknowledgment is performed for update result acknowledgment (Step 311). At Steps 309, 310, and 311, the same processing as of Steps 305, 306, and 309 is respectively performed. Reflection at the wireless communication devices AO1 is notified with timing block allocation update timing in timing block allocation information and the setting is reflected in the relevant devices with that timing. Each wireless communication device AO1 may manage time. Thus, the wireless communication devices can change the group allocation thereof in unison in response to notification of update timing.

<Operation of Wireless Communication Device>

Figure 2:
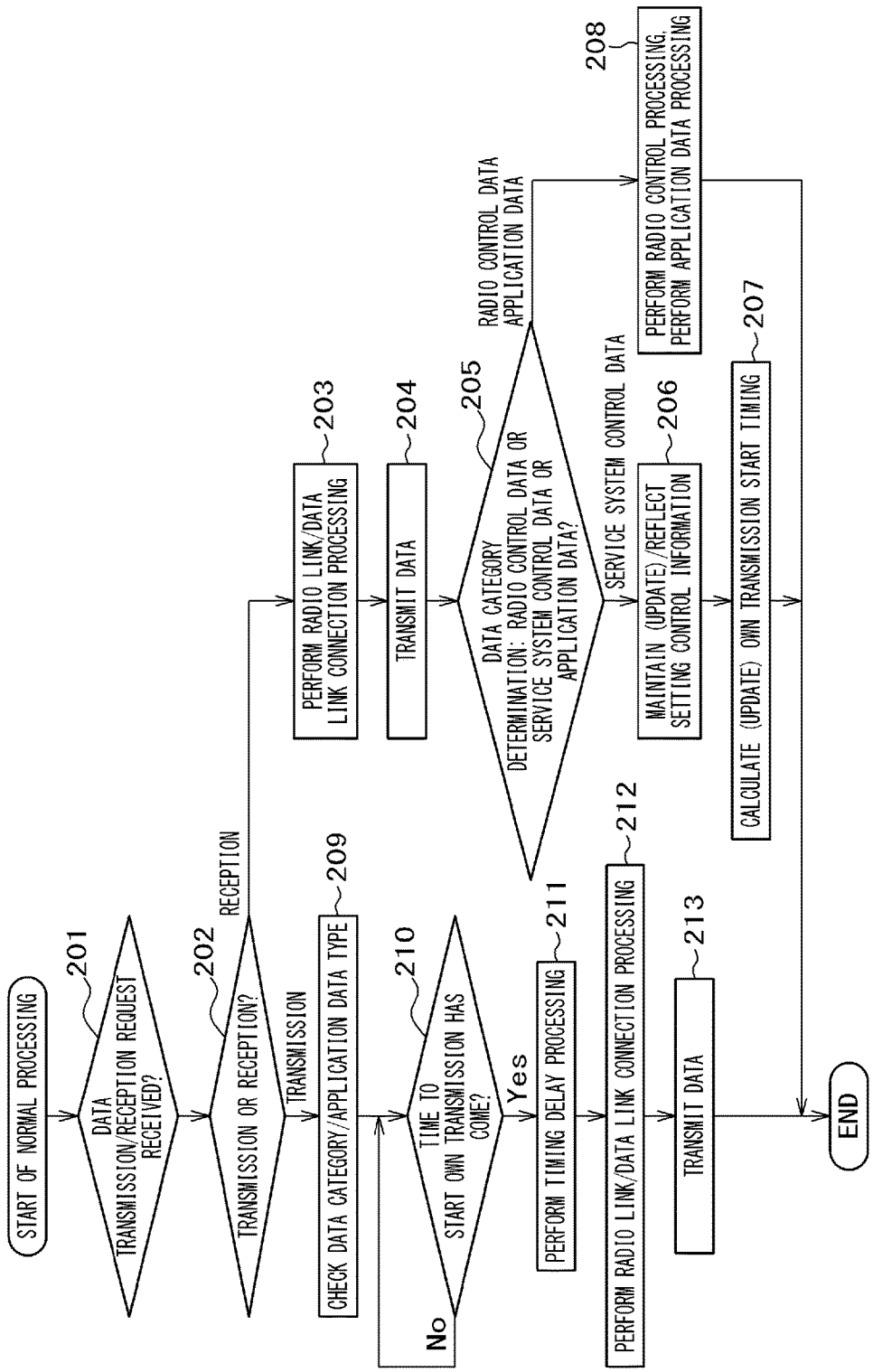
FIG. 2 is a flow diagram illustrating the operation of a wireless communication device in the example in a normal mode.

A description will be given to the flow of operation of each wireless communication device in the example with reference to FIG. 1, FIG. 2, FIG. 6, and FIG. 9A. FIG. 1 is a flow diagram of the operation of each wireless communication device in the communication service system in the example as is started up immediately after start of power supply. FIG. 2 is a flow diagram of the operation of each wireless communication device in the communication service system in the example as in normal operation. FIG. 6 illustrates a concept of timing dispersion of timing blocks in the communication service system in the example.

When power is supplied to each wireless communication device AO1, as shown in FIG. 1, the wireless communication device AO1 performs its own initialization (Step 101). Subsequently, the wireless communication device AO1 performs a cell search for a wireless network AO2 where the device is possibly located and acquires wireless network information from a channel for broadcasting (Step 102). This wireless network information includes, for example, wireless network timing managed in the wireless network AO2, time information, a radio parameter specific to the relevant cell, cell identification information, neighboring cell information, and the like. Subsequently, the wireless communication device AO1 checks whether the device has participated in the communication service system from which the device desires to receive services (Step 103).

When the wireless communication device has not participated (when a negative judgment is made at Step 103), the device performs position registration processing (Step 107, Step 301) and radio link/data link connection processing (Step 108, Step 302). In addition, the wireless communication device transmits device information (Step 109, Step 303) in order to participate in the communication service system. Based on the device information from the wireless communication device AO1, the higher-level server AO3 performs group determination for the relevant wireless communication device AO1, generates initial setting control information, and transmits the information to the wireless communication device AO1. The wireless communication device AO1 receives the initial setting control information (Step 110). As the result of Step 109 and Step 110, the processing of the wireless communication device AO1 participating in the service system is completed. The received initial setting control information is maintained in the relevant device and setting and control associated therewith is reflected in the relevant device (Step 111, Step 306). Based on the timing block allocation information and group allocation information included in the initial setting control information, the wireless communication device calculates timing with which the device is permitted to start transmission (own transmission start timing) (Step 112) and the flow proceeds to normal processing (Step 113).

Meanwhile, when the wireless communication device has participated (when an affirmative judgment is made at Step 103), setting control information is already maintained in the device and timing block allocation information and group allocation information are known. Based on the timing block allocation information and the group allocation information, the wireless communication device calculates position registration start timing in the same manner as the above-mentioned calculation of own transmission start timing (Step 104). Position registration start timing can be calculated, for example, by handling the group of data #1 in the group allocation information in the setting control information mentioned above with reference to FIG. 9A as a default group of the wireless communication device AO1. Then the wireless communication device monitors whether the calculated time to start position registration has come (Step 105) and when the time to start position registration has come, the device starts position registration. The wireless communication device performs timing delay processing so that the position registration start timing of a plurality of wireless communication devices AO1 assigned to an identical group can be dispersed (Step 106).

A description will be given to timing delay processing with reference to FIG. 6. Since a timing block has a time equivalent to a timing block length: t<s> as mentioned above, dispersion processing is performed within the time. When a time to start position registration has come, for example, random numbers are generated at the relevant wireless communication device AO1 and a timing delay time (td) is provided based on the random numbers. Alternatively, a timing delay time (td) is provided based on a device ID (device identification). After this timing delay time (td) has passed, actual position registration processing is performed (Step 107, Step 301) and subsequently, radio link/data link connection processing is performed (Step 108, Step 302). The processing of Steps 109 to 113 is the same as mentioned above. System re-participation processing (Step 114) is performed and transmission start timing for the relevant device is recalculated. The flow then proceeds to normal processing.

A description will be given to operation in normal processing with reference to FIG. 2. After proceeding to normal processing, data transmission/reception processing is performed when a transmission request from the relevant wireless communication device AO1 to the higher-level server AO3 is detected or when data arrives via the wireless network AO2 (a reception request is detected). When this transmission request or reception request is detected (Step 201), first, it checked whether the request is a transmission request or a reception request (Step 202). When the request is a transmission request, a data category/application data type is checked (Step 209). A description will be given to data categories. Data handled by each wireless communication device AO1 includes:

(1) data related to radio state control for the management of movement within a wireless network and radio resource management: radio control data category, (2) data related to device information, setting control, and acknowledgment: service system control data category, (3) data transmitted/received by an application for receiving services: application data category, and the like. A description will be given to data category/application data type check. When there are a plurality of types of data handled by an application, as mentioned above, a plurality of data types can be defined according to the characteristics thereof. In addition, when own transmission start timing differs from data to data, including the data under the above categories (1) and (2), it is determined which start timing should be applied. This is data category/application data type check. As the result of a data category/application data type being checked, own start timing that should be applied is selected from among timing calculated through an own transmission start timing calculation. Therefore, an arrival of that time is monitored (Step 210). When the selected time to start own transmission has come, the same timing delay processing as at start-up is performed (Step 211). After this timing delay time has passed, radio link/data link connection processing is performed (Step 212) and subsequently, actual data transmission is performed (Step 213).

The above-mentioned data categories (1) and (2), their groups may be predetermined in the system or the same group as data #1 (default) in the example shown in FIG. 8 may be assigned. Though not specifically described in the example of device information in FIG. 7 or the description of a concept of grouping in FIG. 8, they may also be included in (application) data types. Then the parameters in each (application) data type may be made appropriate and transmitted as device information so as to be handled as objects of grouping at the higher-level server AO3. In addition, a data category or an application data type for which transmission can be started with any timing may be provided by defining a data type of "no group."

When it is determined at Step 202 that the request is a reception request, radio link/data link connection processing is performed for data reception (Step 203) and data reception is performed (Step 204). Subsequently, the data category of the received data is checked (Step 205). When it is determined that the received data is service system control data, the received setting control information is maintained and updated and reflected (Step 206). Then the own transmission start timing is updated as required (Step 207). At Steps 206 and 207, the same processing as at start-up is performed. When it is determined at Step 205 that the received data is radio control data or application data, processing is performed in accordance with the received radio control data or application data (Step 208).

<Operation after Power Failure/Power Restoration>

A description will be given to an operation performed when power is supplied to wireless communication devices AO1 in unison by power restoration after the power supply to the wireless communication devices AO1 is interrupted over a wide area due to a power failure or the like caused by a large-scale disaster or the like. When a wireless communication device AO1 has participated in the relevant communication service system, the device performs the operation performed in such a case as described in the above section of <Operation of Wireless Communication Device>. A more specific description will be given. In the position registration start timing calculation processing at Step 104, timing block allocation information and group allocation information are known. Therefore, position registration is not started in unison and wireless communication devices AO1 supplied with power perform position registration with respective timing based on timing block allocation information and group allocation information already possessed by themselves. As a result, the communication timing of the wireless communication devices AO1 within the service system is dispersed.

According to the example, the communication timing of wireless communication devices can be dispersed. Therefore, an advantage is brought about even when a power failure is caused by a large-scale disaster or the like and the wireless communication devices at the charge of a communication service system start communication in unison, triggered by power restoration. Congestion of system processing can be reduced and thus a possibility of such a trouble as system down resulting can be reduced.

Up to this point, a concrete description has been given to the invention made by the present inventors. However, the present invention is not limited to the above-mentioned example and may be variously modified, needless to add.

REFERENCE SIGNS LIST

AO1: wireless communication device
AO2: wireless network
AO2_1: radio base station
AO2_2: switchboard
AO3: data server (higher-level server)

The invention claimed is:

1. A communication timing control method for a communication service system including wireless communication devices, a wireless network, and a higher-level server, comprising the steps of:
grouping the wireless communication devices using device information including the characteristics of services provided to the wireless communication devices participating in the communication service system via the wireless network, the characteristics of communication data handled by an execution application to receive the provided services, and the mobility characteristics of the wireless communication devices receiving the provided services,
determining communication timing specific to each group with respect to the grouped wireless communication devices, and
performing communication based on the communication timing specific to each group,
wherein based on the characteristics of data handled by the wireless communication devices, the data is categorized into:
radio control data category for data related to radio state control for the management of movement within the wireless network and radio resource management,
service system control data category for data related to the device information, setting control, and acknowledgment, and
application data category for data transmitted and received by an application for receiving services, and wherein when data is transmitted from the wireless communication devices, applied transmission start timing is varied depending on the category of that data.

2. The communication timing control method according to claim 1,
wherein the communication timing specific to each group is timing that is given according to timing block allocation information including a timing block which is timing with which a wireless communication device assigned to any group is permitted to start transmission, a group pattern indicating group allocation for each timing block, a timing block length indicating the duration of the timing block, and a group pattern cycle indicating the repetition cycle of the relevant group pattern and with which starting transmission is permitted within the communication service system.

3. The communication timing control method according to claim 2,
wherein setting control information is generated based on a result of the grouping and the timing block allocation information and is transmitted to the wireless communication devices.

4. The communication timing control method according to claim 1,
wherein with respect to the characteristics of the provided services, a first score is individually given according to the publicness thereof and the number of users receiving the provided services,
wherein with respect to the characteristics of communication data handled by an execution application for receiving the provided services, a second score is individually given according to the periodicity, immediacy, and data volume of that data,
wherein with respect to the mobility characteristics of a wireless communication device receiving the provided services, a third score is individually given depending on fixed installation or moving speed, and
wherein grouping is performed based on a score obtained by totaling the first, second, and third scores.

5. The communication timing control method according to claim 4,
wherein the higher-level server performs grouping by receiving the device information and determining a group of each of the wireless communication devices.

6. The communication timing control method according to claim 1,
wherein the device information further includes information specific to each of the wireless communication devices and the state of the device, and
wherein the device information is transmitted from the wireless communication device.

7. A communication service system comprising wireless communication devices, a wireless network, and a higher-level server,
wherein the higher-level server is configured to:
group the wireless communication devices using device information including the characteristics of services provided to the wireless communication devices participating in the communication service system via the wireless network, the characteristics of communication data handled by an execution application for receiving the provided services, and the mobility characteristics of each wireless communication device receiving the provided services,
determine communication timing specific to each group with respect to the grouped wireless communication devices, and
transmit the communication timing specific to each group to the wireless communication devices, and
wherein the wireless communication devices are configured to perform communication according to the communication timing specific to each group,
wherein based on the characteristics of data handled by the wireless communication devices, the data is categorized into:
radio control data category for data related to radio state control for the management of movement within the wireless network and radio resource management,
service system control data category for data related to the device information, setting control, and acknowledgment, and
application data category for data transmitted and received by an application for receiving services, and
wherein when data is transmitted from the wireless communication devices, applied transmission start timing is varied depending on the category of that data.

8. The communication timing control method according to claim 7,
wherein the communication timing specific to each group is timing that is given according to timing block allocation information including a timing block which is timing with which a wireless communication device assigned to any group is permitted to start transmission, a group pattern indicating group allocation for each timing block, a timing block length indicating the duration of the timing block, and a group pattern cycle indicating the repetition cycle of the relevant group pattern and with which starting transmission is permitted within the communication service system.

9. The communication timing control method according to claim 8,
wherein setting control information is generated based on a result of the grouping and the timing block allocation information and is transmitted to the wireless communication devices.

10. The communication timing control method according to claim 7,
wherein with respect to the characteristics of the provided services, a first score is individually given according to the publicness thereof and the number of users receiving the provided services,
wherein with respect to the characteristics of communication data handled by an execution application for receiving the provided services, a second score is individually given according to the periodicity, immediacy, and data volume of that data,
wherein with respect to the mobility characteristics of a wireless communication device receiving the provided services, a third score is individually given depending on fixed installation or moving speed, and
wherein grouping is performed based on a score obtained by totaling the first, second, and third scores.

11. The communication timing control method according to claim 10,
wherein the higher-level server performs grouping by receiving the device information and determining a group of each of the wireless communication devices.

12. The communication timing control method according to claim 7,
wherein the device information further includes information specific to each of the wireless communication devices and the state of the device, and
wherein the device information is transmitted from the wireless communication device.

13. A wireless communication terminal used in a communication service system including wireless communication devices equipped with the wireless communication terminal and data terminal equipment, a wireless network, and a higher-level server,
  wherein device information including the characteristics of services provided to the wireless communication devices participating in the communication service system via the wireless network, the characteristics of communication data handled by an execution application for receiving the provided services, and the mobility characteristics of each wireless communication device receiving the provided services is transmitted from the data terminal to the higher-level server,
  wherein the wireless communication devices are grouped based on the device information, communication timing specific to each group is determined with respect to the grouped wireless communication devices, and transmission start timing is determined according to the communication timing specific to each group transmitted from the higher-level server, and
  wherein transmission is started according to the transmission start timing,
  wherein based on the characteristics of data handled by the wireless communication devices, the data is categorized into:
  radio control data category for data related to radio state control for the management of movement within the wireless network and radio resource management,
  service system control data category for data related to the device information, setting control, and acknowledgment, and
  application data category for data transmitted and received by an application for receiving services, and
  wherein when data is transmitted from the wireless communication devices, applied transmission start timing is varied depending on the category of that data.

14. The communication timing control method according to claim 13,
  wherein the communication timing specific to each group is timing that is given according to timing block allocation information including a timing block which is timing with which a wireless communication device assigned to any group is permitted to start transmission, a group pattern indicating group allocation for each timing block, a timing block length indicating the duration of the timing block, and a group pattern cycle indicating the repetition cycle of the relevant group pattern and with which starting transmission is permitted within the communication service system.

15. The communication timing control method according to claim 14,
  wherein setting control information is generated based on a result of the grouping and the timing block allocation information and is transmitted to the wireless communication devices.

16. The communication timing control method according to claim 13,
  wherein with respect to the characteristics of the provided services, a first score is individually given according to the publicness thereof and the number of users receiving the provided services,
  wherein with respect to the characteristics of communication data handled by an execution application for receiving the provided services, a second score is individually given according to the periodicity, immediacy, and data volume of that data,
  wherein with respect to the mobility characteristics of a wireless communication device receiving the provided services, a third score is individually given depending on fixed installation or moving speed, and
  wherein grouping is performed based on a score obtained by totaling the first, second, and third scores.

17. The communication timing control method according to claim 16,
  wherein the higher-level server performs grouping by receiving the device information and determining a group of each of the wireless communication devices.

18. The communication timing control method according to claim 13,
  wherein the device information further includes information specific to each of the wireless communication devices and the state of the device, and
  wherein the device information is transmitted from the wireless communication device.

* * * * *